US010586056B2

(12) United States Patent
Dragone et al.

(10) Patent No.: US 10,586,056 B2
(45) Date of Patent: *Mar. 10, 2020

(54) SYNCHRONIZING WRITE OPERATIONS

(71) Applicant: International Business Machines Corporation, Armonk, NY (US)

(72) Inventors: Silvio Dragone, Winterthur (CH); Nihad Hadzic, Wappingers Falls, NY (US); William Santiago Fernandez, Poughkeepsie, NY (US); Tamas Visegrady, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,130

(22) Filed: Nov. 6, 2017

(65) Prior Publication Data
US 2018/0314840 A1    Nov. 1, 2018

Related U.S. Application Data

(63) Continuation of application No. 15/581,920, filed on Apr. 28, 2017.

(51) Int. Cl.
*G06F 21/60* (2013.01)
*G06F 21/57* (2013.01)
(Continued)

(52) U.S. Cl.
CPC ............ *G06F 21/602* (2013.01); *G06F 3/065* (2013.01); *G06F 3/0622* (2013.01);
(Continued)

(58) Field of Classification Search
CPC ........ G06F 21/602; G06F 21/72; G06F 21/57; G06F 3/0685; G06F 3/0634; G06F 3/065;
(Continued)

(56) References Cited

U.S. PATENT DOCUMENTS 5,057,996 A    10/1991 Cutler et al.
5,327,553 A    7/1994 Jewett et al.
(Continued)

OTHER PUBLICATIONS

List of IBM Patents or Patent Applications Treated as Related (Appendix P); Filed Nov. 6, 2017, 2 pages, which is now U.S. Appl. No. 15/804,130.

(Continued)

*Primary Examiner* — Matthew Smithers
(74) *Attorney, Agent, or Firm* — Cantor Colburn LLP; Steven Chiu

(57) ABSTRACT

A method includes determining, by a persistent memory lockstep unit of a hardware security module, that a first processor is attempting to change a state of the hardware security module. The method also includes determining, by the persistent memory lockstep unit, whether a second processor has attempted the same change. The method also includes preventing the change until both the first processor and the second processor have attempted the same change. The method also includes permitting the change to the state of the hardware security module based on a determination that both the first processor and the second processor have both attempted the same change.

7 Claims, 5 Drawing Sheets

(51) Int. Cl.
  *G06F 21/72* (2013.01)
  *G09C 1/00* (2006.01)
  *G06F 3/06* (2006.01)
  *H04L 9/08* (2006.01)

(52) U.S. Cl.
  CPC .......... *G06F 3/0634* (2013.01); *G06F 3/0685* (2013.01); *G06F 21/57* (2013.01); *G06F 21/72* (2013.01); *G09C 1/00* (2013.01); *H04L 9/08* (2013.01); *H04L 2209/12* (2013.01)

(58) Field of Classification Search
  CPC ..... G06F 3/0622; H04L 9/08; H04L 2209/12; G09C 1/00
  See application file for complete search history.

(56) References Cited

U.S. PATENT DOCUMENTS

| | | | |
|---|---|---|---|
| 5,784,630 A * | 7/1998 | Saito | G06F 9/30087 709/213 |
| 5,914,902 A * | 6/1999 | Lawrence | G01R 31/31908 365/189.05 |
| 7,085,386 B2 | 8/2006 | Audebert et al. | |
| 7,181,576 B2 * | 2/2007 | Gammel | G06F 12/0804 711/141 |
| 7,921,234 B2 | 4/2011 | Condorelli et al. | |
| 8,027,665 B2 | 9/2011 | Frank | |
| 8,375,219 B2 | 2/2013 | Westerinen et al. | |
| 8,631,058 B2 * | 1/2014 | Dragone | G06F 7/588 708/255 |
| 8,631,247 B2 | 1/2014 | O'Loughlin et al. | |
| 9,413,730 B1 | 8/2016 | Narayan et al. | |
| 9,424,421 B2 | 8/2016 | Aissi et al. | |
| 9,467,292 B2 | 10/2016 | Nahari | |
| 2007/0171754 A1 * | 7/2007 | Nam | G11C 8/16 365/230.03 |
| 2007/0180228 A1 * | 8/2007 | Mattsson | G06F 21/602 713/156 |
| 2008/0022362 A1 | 1/2008 | Hinton et al. | |
| 2011/0010720 A1 | 1/2011 | Smith et al. | |
| 2013/0061300 A1 | 3/2013 | Novak et al. | |
| 2014/0025871 A1 * | 1/2014 | Kanai | G06F 12/1425 711/103 |
| 2015/0358312 A1 | 12/2015 | Kancharla et al. | |
| 2016/0232381 A1 | 8/2016 | Ju et al. | |
| 2018/0314649 A1 * | 11/2018 | Dragone | G06F 21/57 |
| 2018/0314650 A1 * | 11/2018 | Dragone | G06F 21/57 |
| 2018/0314839 A1 * | 11/2018 | Dragone | G06F 21/602 |
| 2019/0238333 A1 | 8/2019 | Grubin et al. | |

OTHER PUBLICATIONS

Silvio Dragone, et al. "Synchronizing Write Operations" U.S. Appl. No. 15/581,920, filed Apr. 28, 2017.

Silvio Dragone, et al. "Synchronizing Requests to Access Computing Resources" U.S. Appl. No. 15/581,796, filed Apr. 28, 2017.

Silvio Dragone, et al. "Synchronizing Requests to Access Computing Resources" U.S. Appl. No. 15/804,208, filed Nov. 6, 2017.

Köppel, et al. "Analysis of a Hardware Security Module's High-Availability Setting," May 31, 2013, vol. 11, Issue 3, pp. 77-80, http://ieeexplore.ieee.org/document/6522278/.

Sehr, et al. "Adapting Software Fault Isolation to Contemporary CPU Architectures," 19th USENIX Security Symposium, USENIX (2010), pp. 1-11.

\* cited by examiner

SYNCHRONIZING WRITE OPERATIONS

DOMESTIC PRIORITY

This application is a continuation of U.S. application Ser. No. 15/581,920, filed Apr. 28, 2017, the contents of which are incorporated by reference herein in its entirety.

BACKGROUND

One or more embodiments relate in general to synchronizing write operations. More specifically, one or more embodiments relate to synchronizing attempts to write to persistent memory after performing cryptographic operations.

Certain types of high-security processing and cryptographic operations cannot be performed at the operating system level because computing at the operating system level may not be sufficiently secure. Rather, the processing and operations are performed at the hardware level by Hardware Security Modules (HSMs), for example. HSMs can be implemented on specific cryptographic hardware products such as, for example, cryptocards.

SUMMARY

According to one or more embodiments, a method includes determining, by a persistent memory lockstep unit of a hardware security module, that a first processor is attempting to change a state of the hardware security module. The method also includes determining whether a second processor has attempted the same change. The method also includes preventing the change until both the first processor and the second processor have attempted the same change. The method also includes permitting the change to the state of the hardware security module based on a determination that both the first processor and the second processor have both attempted the same change.

According to one or more embodiments, a computer system includes a memory. The computer system also includes a processor system communicatively coupled to the memory. The processor system is configured to perform a method including determining that a first processor is attempting to change a state of a hardware security module. The method also includes determining whether a second processor has attempted the same change. The method also includes preventing the change until both the first processor and the second processor have attempted the same change. The method also includes permitting the change to the state of the hardware security module based on a determination that both the first processor and the second processor have both attempted the same change.

According to one or more embodiments, a computer program product including a computer-readable storage medium is provided. The computer-readable storage medium has program instructions embodied therewith. The computer-readable storage medium is readable by a processor system to cause the processor system to perform a method. The method includes determining that a first processor is attempting to change a state of a hardware security module. The method also includes determining whether a second processor has attempted the same change. The method also includes preventing the change until both the first processor and the second processor have attempted the same change. The method also includes permitting the change to the state of the hardware security module based on a determination that both the first processor and the second processor have both attempted the same change.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
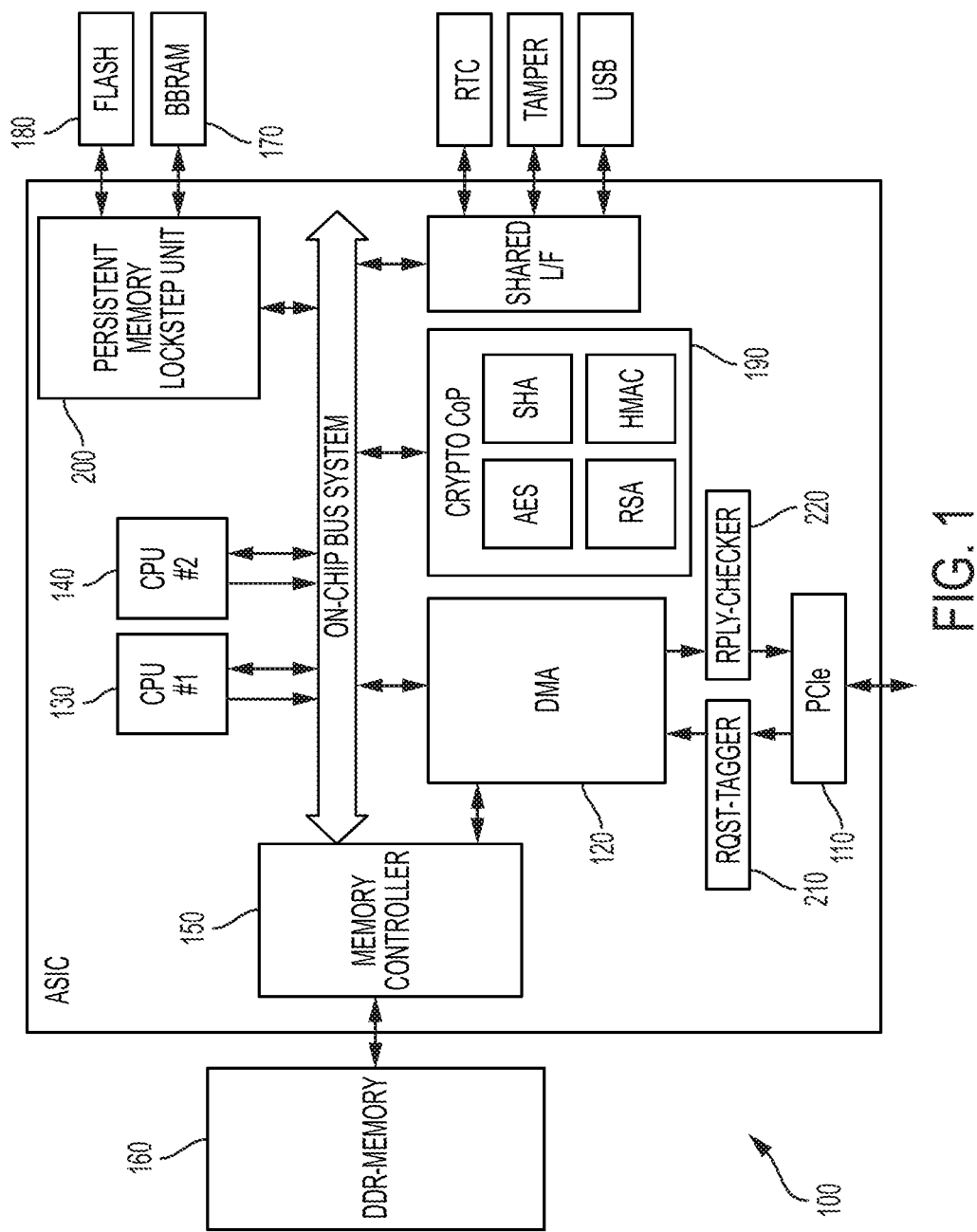
FIG. 1 depicts a computing system in accordance with one or more embodiments of the present invention.

In accordance with one or more embodiments, methods and computer program products for synchronizing write operations to persistent memory are provided. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

The next generation of HSMs will likely be implemented using application-specific integrated circuit (ASIC) components. These ASICs can perform the necessary cryptographic functionality of the HSMs. When performing the cryptographic functionality, the ASICs need to satisfy Reliability, Availability, and Serviceability (RAS) requirements. Specifically, each ASIC can include at least one processor, and each processor needs to satisfy the necessary RAS requirements.

The processor within an ASIC may or may not be customizable by a user. In instances where the processor is not customizable by the user, if the processor is not already designed to satisfy the RAS requirements, the user is unable to configure the processor to perform in a manner that satisfies the RAS requirements. However, despite not being able to customize the processor of an HSM to operate in accordance with RAS requirements, the user may still need to ensure that the HSM's overall functionality fulfills the RAS requirements.

In view of the need to ensure that an HSM's overall functionality fulfills RAS requirements, the current approaches typically determine whether the HSM satisfies the requirements based upon whether or not the HSM's processor is performing in a glitch-free manner or is at least consistently detecting glitches. The current approaches determine whether the HSM's processor is performing in a glitch-free manner by comparing the output produced by the HSM's processor with the output produced by another processor. In some cases, the HSM can have two processors (a first processor and a second processor) that both receive the same inputs/requests from a host. Both the first processor and the second processor then perform operations in response to the received requests from the host. Performing the operations then results in a particular output, and the output from the processors are compared against each other. If both the first processor and the second processor receive the same inputs/requests, then the first processor and the second processor can be considered to operate in parallel/lockstep with each other, and their respective outputs should be the same. The respective outputs from each processor can be compared in order to determine if any error has occurred. If the outputs match, then the first processor and the second processor are considered to have operated in a glitch-free manner. If the outputs do not match, then a glitch has likely occurred in at least one of the processors.

However, the current processor architectures are often unable to operate the first processor and the second processor in proper lockstep with each other because a processor can only operate in lockstep with another processor if both processors are specifically designed to operate in lockstep. Specifically, two processors are able to operate in lockstep with each other only if the cores of both processors are configured to engage in lockstep performance. If either of the processors is not specifically designed to operate in lockstep, then operating the processors in lockstep will not yield outputs that can be compared, because the processors will inexplicably begin to perform in an asynchronous manner. As such, the outputs of the processors may differ from each other, even in the absence of glitches.

In view of the difficulties of the previous approaches, one or more embodiments of the present invention are directed to a computer-implemented method of verifying that the processors of an HSM are operating properly, even if the output of the processors cannot be compared against each other as a result of the processors not being specifically designed to perform in lockstep. Rather than comparing the outputs of processors against each other (as performed by the current approaches), embodiments of the present invention determine that the processors are operating properly by verifying that the processors are attempting to perform the same write operations, as described in more detail below.

In the course of performing cryptographic functionality, an HSM manages and stores cryptographic keys, certificates, and/or configurations. These cryptographic keys, certificates, and/or configurations constitute a state of the HSM. With embodiments of the present invention, the state of an HSM can be stored in a persistent memory of the HSM. Persistent memory of the HSM can include, for example, flash memory, read-only memory (ROM), battery-backup random-access memory (BBRAM), and/or disks.

When one or more processors attempt to write data to the persistent memory (i.e., when one or more processors attempt to change a state of the HSM), one or more embodiments of the present invention verify that these write operations are correct, in order to ensure that the HSM meets the RAS requirements.

Specifically, one or more embodiments of the present invention configure at least two separate processors to receive the same requests and to perform the same operations, in parallel. The two processors can belong to the same HSM, for example. Embodiments of the present invention can utilize hardware-enforced synchronization in order to ensure that a write operation (to the persistent memory) that is attempted by one processor is also attempted by the other processor. As such, embodiments of the present invention can verify that the write attempts of the processors are consistent with each other.

FIG. 1 depicts a computing system 100 in accordance with one or more embodiments of the present invention. Computing system 100 can be implemented as a hardware security module. Computing system 100 can receive incoming requests from a host via a bus 110. Bus 110 can be a Peripheral Component Interconnect Express (PCIe) bus, for example. Computing system 100 can also include a Direct Memory Access (DMA) controller 120 that can communicate with at least a first processor (CPU) 130 and a second processor 140 to process the requests. The first processor 130 and second processor 140 can also communicate with memory controller 150 and/or a persistent memory lockstep unit 200 when accessing volatile memory (such as DDR-Memory, for example) 160, battery-backup random-access memory (BBRAM) 170, and/or flash memory 180, for example. This memory can be considered to be persistent memory. Computing system 100 can thus perform a variety of cryptographic operations 190 such as, for example, Advanced Encryption Standard (AES) operations, RSA operations, Secure Hash Algorithm (SHA) operations, and/or keyed-hash message authentication code (HMAC) operations.

One or more embodiments can be directed to a computer-implemented method performed by a hardware security module. For example, the method of one or more embodiments can be performed by DMA controller 120, memory controller 150, and/or persistent memory lockstep unit 200. As such, one or more embodiments can function as an interface between the processors and the persistent memory. When a first processor attempts to perform a first write operation to the persistent memory, an embodiment can determine that the first write operation is a correct operation by verifying that a second processor is also attempting to perform the same write operation to the persistent memory. If the same write operation is attempted by both the first processor and the second processor, embodiments of the present invention consider the write operation to be a correct operation. Embodiments of the present invention can then permit at least one of the write operations to proceed, and the corresponding data is written to the persistent memory, and the state of the HSM is changed.

Figure 2:
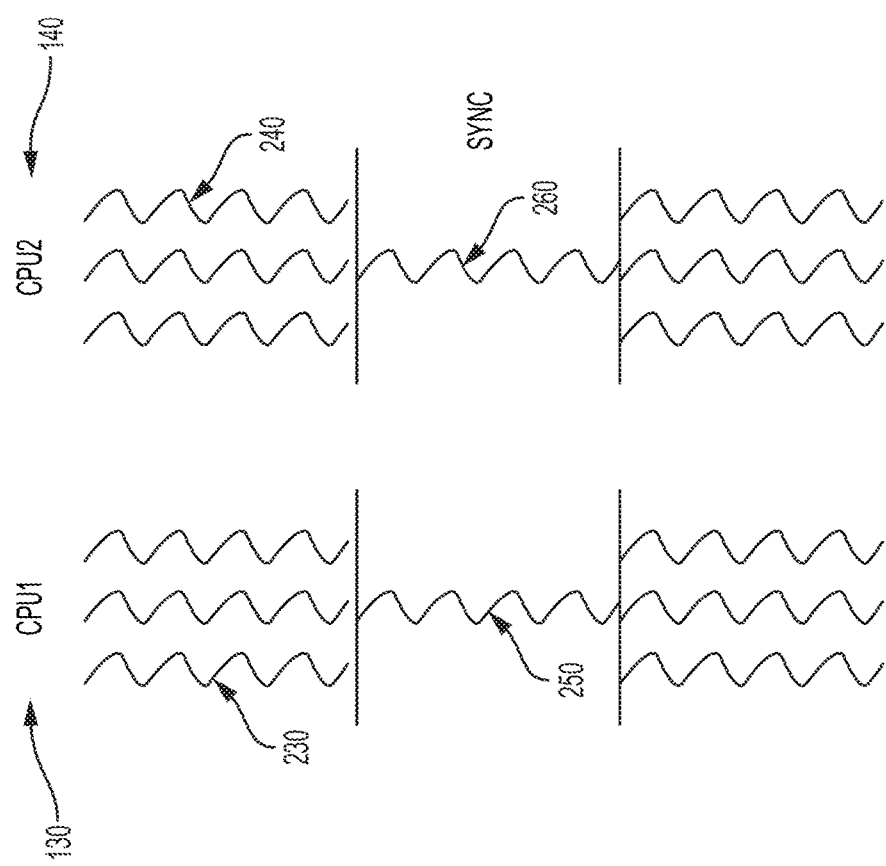
FIG. 2 depicts synchronizing write operations in accordance with one or more embodiments of the present invention.

FIG. 2 depicts synchronizing write operations in accordance with one or more embodiments of the present invention. As shown in FIG. 2, a first processor 130 and a second processor 140 can each be performing a plurality of operations in parallel. First processor 130 is performing operations 230, and second processor 140 is performing operations 240. As described above, operations 230 and operations 240 can be a same set of operations. Suppose first processor 130 is attempting to perform a write operation 250 to persistent memory. One or more embodiments of the present invention can prevent first processor 130 from performing write operation 250 until second processor 140 also attempts to perform the same write operation. When second processor 140 attempts the same operation (operation 260), then one more embodiment can then synchronize the write operations and permit at least one write operation to the persistent memory.

Each write operation for writing data to persistent memory can correspond to writing data to a channel of the persistent memory. A "channel" can be considered to be at least one region of the persistent memory. As soon as a first processor attempts to perform a write operation to a channel, one or more embodiments can prevent any write from occurring to the channel until a second processor also attempts to perform a write operation to the same channel and/or attempts to perform the same write operation to the same channel. As discussed above, one or more embodiments can confirm that each processor is attempting to perform the same write operation, before actually permitting the write operation to proceed.

With certain instances, a first processor can receive a plurality of requests and can be performing a plurality of operations at the same time, where at least one of the operations is a write operation. In the event that the write operation of the first processor is being prevented from writing to the persistent memory (because the second processor has not yet attempted to perform the same write operation), the first processor can still continue performing the other non-writing operations.

In other words, the first and second processors can be performing a plurality of operations in parallel, and the first processor can be awaiting permission to perform a write operation. One or more embodiments allow the first processor to continue performing the other non-writing operations because the other non-writing operations to be performed by the first processor can be separate from the write operation.

With one or more embodiments of the present invention, in order to perform an operation of a received request, a processor needs to perform the operation during one or more request windows. A "request window" can be considered to be a duration of time during which an operation is able to be performed. The number of request windows that are necessary for performing a particular operation can be dependent upon the particular operation itself. For example, if a write operation seeks to write a large amount of data to the persistent memory, the amount of data to be written can exceed the amount of data that is able to be written during a duration of a single request window. In this case, one or more embodiments can perform the write operation using a plurality of request windows. Therefore, in the event that a first processor attempts to perform a write operation that requires a plurality of request windows to be allocated to the write operation, one embodiment can prevent the write operation from being processed until the second processor also attempts to perform the write operation. One or more embodiments can reserve a sequence of request windows for performing a write operation, if the write operation needs a plurality of request windows to complete the writing of data to the persistent memory.

If the first processor has allocated a sequence of request windows and is attempting to perform a write operation, embodiments of the present invention can prevent the write operation from occurring until the second processor also attempts the same write operation, as discussed above. If the first processor is prevented from performing the write operation, the first processor can communicate with the second processor to prompt/trigger the second processor to begin performance of the same write operation. Different processors can coordinate with each other in order to enable operations to be executed/performed in synchronization with each other, within request windows.

While a write operation of a processor is temporarily prevented/blocked, one or more embodiments may allow the processor to continue performing other operations using other request windows. For example, suppose that a first processor is using four request windows (i.e., window 1, window 2, window 3, and window 4) to perform different operations. In this example, the first processor is using request windows 1-3 to perform a write operation, and the first processor is using request window 4 to perform another operation that is different from the write operation. Next, suppose that embodiments of the present invention use hardware-enforced synchronization to prevent the first processor from performing the write operation using request windows 1-3 until the second processor also attempts to perform the same write operation. Although the first processor is temporarily prevented from performing any write operation with request windows 1-3, one or more embodiments may permit the first processor to continue performing operations using request window 4, because the operation of request window 4 is different from the blocked write operation of request windows 1-3.

One or more embodiments can be implemented within a system that is already using existing firmware/code to perform hardware-based locking of writes to persistent memory. One or more embodiments can function in conjunction with the existing code. Embodiments of the present invention generally do not require host or software cooperation, nor any request tagging. Embodiments can also enable read-only operations to be performed on the persistent memory, without any loss of throughput.

When the first processor and the second processor have both attempted to perform the same write operation, embodiments of the present invention can verify that the write operation is a correct operation. Embodiments can thus allow at least one write operation to be performed, and a write to persistent memory can occur within the appropriate request window(s). With embodiments that only allow one write operation to be performed, the other write operation can be terminated. After this other write operation is terminated, the channel lock (which prevents writes to the persistent memory) can be released. With one or more embodiments, when performing the channel lock, a processor bus blocks the first attempt to perform a write operation (upon the persistent memory) by not acknowledging the first request. One or more embodiments can also perform channel locking by blocking a write queue of the first processor.

As described above, one or more embodiments can synchronize attempts to perform write operations by processors, where the write operations change a state of the HSMs. As such, embodiments of the present invention can verify that state-changing operations are correctly performed. However, embodiments of the present invention are not necessarily limited to verifying that state-changing operations are correctly performed.

Embodiments of the present invention can also verify that "stateless operations" are correctly performed. "Stateless operations" are generally considered to be operations which do not change the state of HSMs. Suppose that a host transmits a request to both a first processor and a second processor. In order to fulfill the request, both the first processor and the second processor need to perform a same stateless operation. Because stateless operations do not write to persistent memory, rather than comparing attempts to perform write operations (as described above), one or more embodiments can verify that the stateless operations are being performed correctly by tagging requests (via Request Tagger 210 of FIG. 1) that are received from the host. By tagging requests, embodiments of the present invention can match the received requests with the output that is produced in response to the received request. With tagged requests, embodiments of the present invention can compare the output that is produced by one processor against the output that is produced by another processor at the outbound side (via Reply Checker 220 of FIG. 1) of the bus 110. As such, embodiments of the present invention can verify that "stateless operations" are correctly performed. This comparison of outputs can occur before the outputs are transmitted back to the host.

Figure 3:
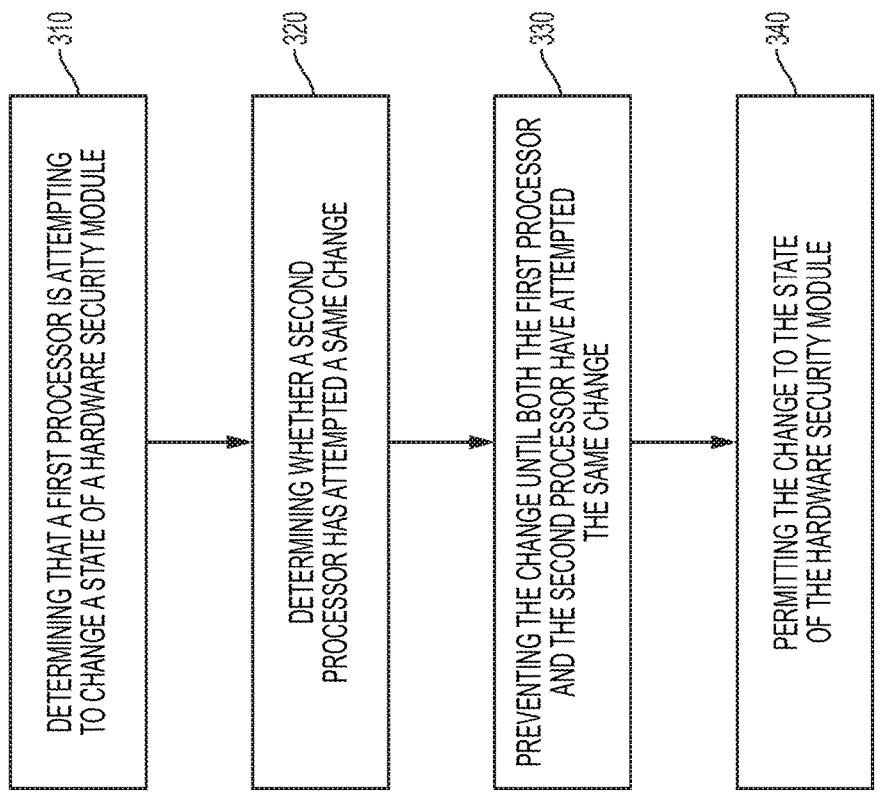
FIG. 3 depicts a flowchart of a method in accordance with one or more embodiments.

FIG. 3 depicts a flowchart of a method in accordance with one or more embodiments. In one or more embodiments of the present invention, the method can be performed by an HSM, a persistent memory lockstep unit/controller, a memory controller, and/or a DMA controller, for example. The method includes, at block 310, determining that a first processor is attempting to change a state of a hardware security module. The method also includes, at block 320, determining whether a second processor has attempted the same change. The method also includes, at block 330, preventing the change until both the first processor and the second processor have attempted the same change. The method also includes, at block 340, permitting the change to the state of the hardware security module based on a determination that both the first processor and the second processor have both attempted the same change.

Figure 4:
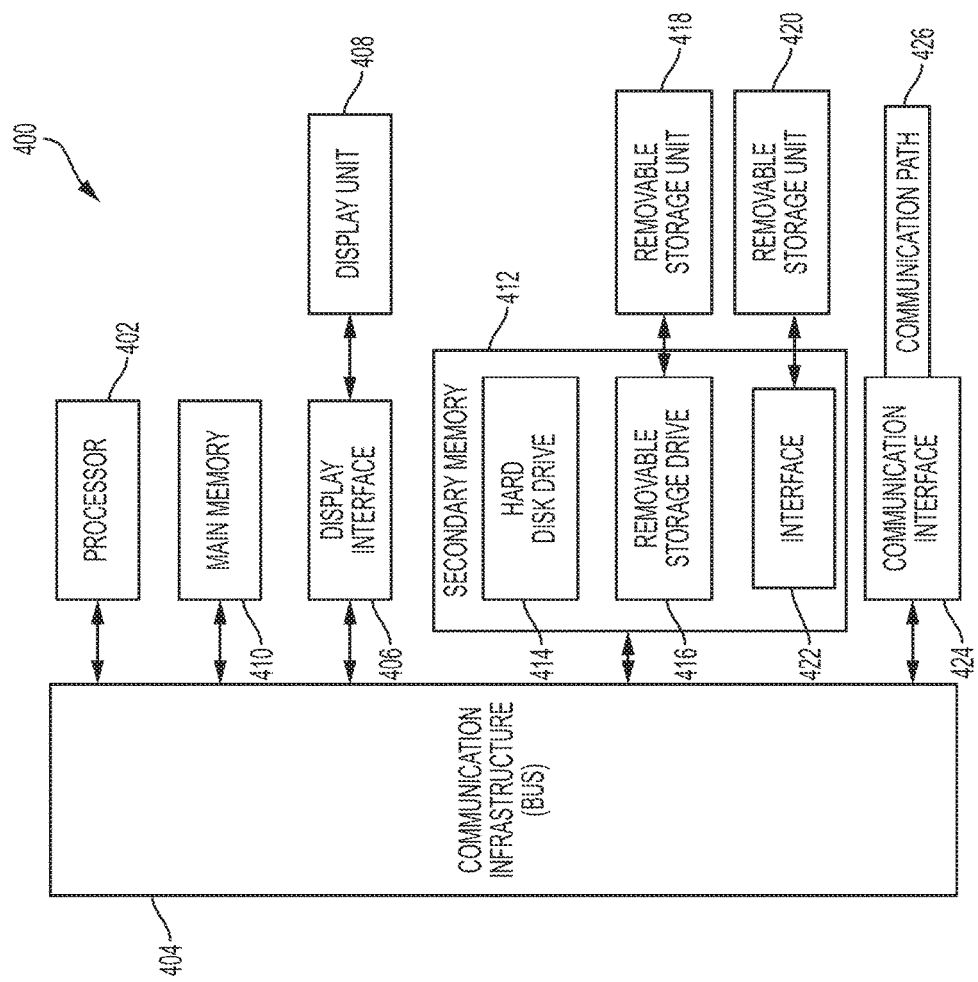
FIG. 4 depicts a high-level block diagram of a computer system, which can be used to implement one or more embodiments.

FIG. 4 depicts a high-level block diagram of a computer system 400, which can be used to implement one or more embodiments. Computer system 400 can correspond to, at least, a hardware security module, a persistent memory lockstep unit/controller, a memory controller, and/or a DMA controller, for example. Computer system 400 can be used to implement hardware components of systems capable of performing methods described herein. Although one exemplary computer system 400 is shown, computer system 400 includes a communication path 426, which connects computer system 400 to additional systems (not depicted) and can include one or more wide area networks (WANs) and/or local area networks (LANs) such as the Internet, intranet(s), and/or wireless communication network(s). Computer system 400 and additional system are in communication via communication path 426, e.g., to communicate data between them.

Computer system 400 includes one or more processors, such as processor 402. Processor 402 is connected to a communication infrastructure 404 (e.g., a communications bus, cross-over bar, or network). Computer system 400 can include a display interface 406 that forwards graphics, textual content, and other data from communication infrastructure 404 (or from a frame buffer not shown) for display on a display unit 408. Computer system 400 also includes a main memory 410, preferably random access memory (RAM), and can also include a secondary memory 412. Secondary memory 412 can include, for example, a hard disk drive 414 and/or a removable storage drive 416, representing, for example, a floppy disk drive, a magnetic tape drive, or an optical disc drive. Hard disk drive 414 can be in the form of a solid state drive (SSD), a traditional magnetic disk drive, or a hybrid of the two. There also can be more than one hard disk drive 414 contained within secondary memory 412. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disc, etc. which is read by and written to by removable storage drive 416. As will be appreciated, removable storage unit 418 includes a computer-readable medium having stored therein computer software and/or data.

In alternative embodiments, secondary memory 412 can include other similar means for allowing computer programs or other instructions to be loaded into the computer system. Such means can include, for example, a removable storage unit 420 and an interface 422. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 420 and interfaces 422 which allow software and data to be transferred from the removable storage unit 420 to computer system 400.

Computer system 400 can also include a communications interface 424. Communications interface 424 allows software and data to be transferred between the computer system and external devices. Examples of communications interface 424 can include a modem, a network interface (such as an Ethernet card), a communications port, or a PC card slot and card, a universal serial bus port (USB), and the like. Software and data transferred via communications interface 424 are in the form of signals that can be, for example, electronic, electromagnetic, optical, or other signals capable of being received by communications interface 424. These signals are provided to communications interface 424 via a communication path (i.e., channel) 426. Communication path 426 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 410 and secondary memory 412, removable storage drive 416, and a hard disk installed in hard disk drive 414. Computer programs (also called computer control logic) are stored in main memory 410 and/or secondary memory 412. Computer programs also can be received via communications interface 424. Such computer programs, when run, enable the computer system to perform the features discussed herein. In particular, the computer programs, when run, enable processor 402 to perform the features of the computer system. Accordingly, such computer programs represent controllers of the computer system. Thus it can be seen from the foregoing detailed description that one or more embodiments provide technical benefits and advantages.

Figure 5:
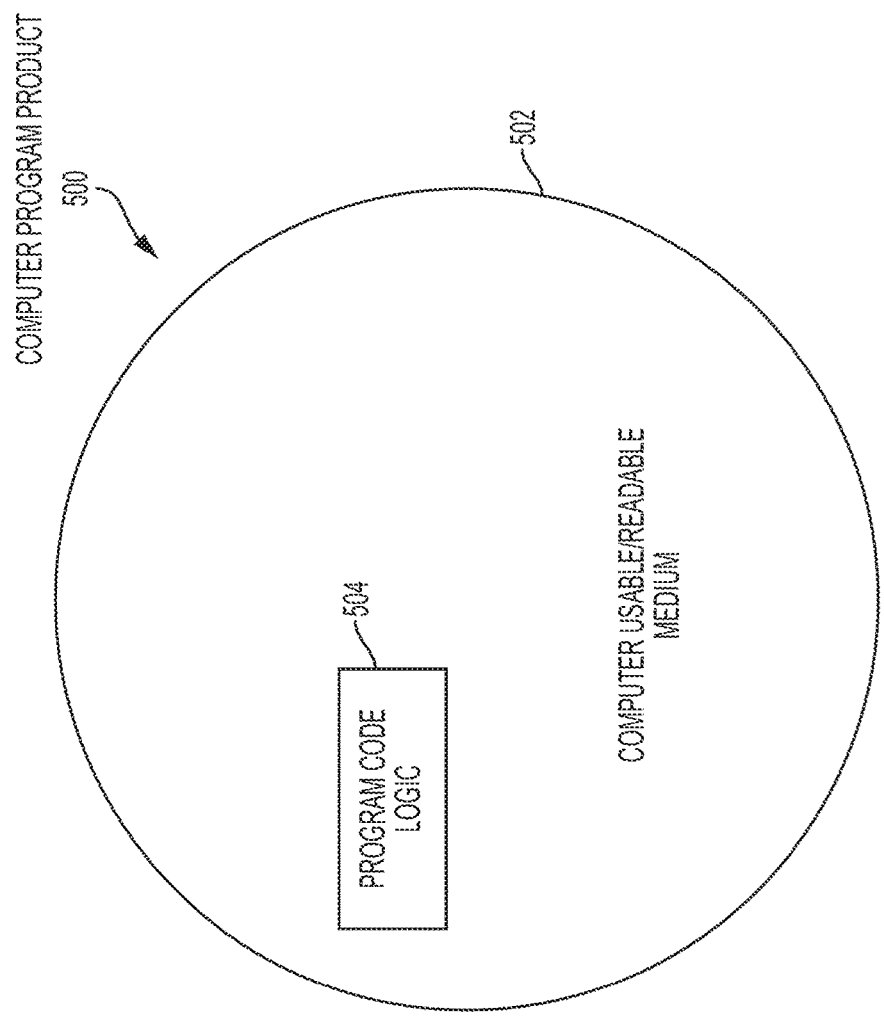
FIG. 5 depicts a computer program product, in accordance with one or more embodiments.

FIG. 5 depicts a computer program product 500, in accordance with an embodiment. Computer program product 500 includes a computer-readable storage medium 502 and program instructions 504.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method, the method comprising:
    determining, by a persistent memory lockstep unit of a hardware security module, that a first processor is attempting to change a state of the hardware security module;
    determining, by the persistent memory lockstep unit, whether a second processor has attempted the same change;
    preventing the change until both the first processor and the second processor have attempted the same change; and
    permitting the change to the state of the hardware security module based on a determination that both the first processor and the second processor have both attempted the same change.

2. The computer-implemented method of claim 1, wherein the determining that the first processor is attempting to change the state comprises determining that the first processor is attempting to perform a write operation to persistent memory of the hardware security module.

3. The computer-implemented method of claim 1, wherein the first processor and the second processor are processors of the hardware security module.

4. The computer-implemented method of claim 2, wherein the persistent memory comprises at least one of flash memory, read-only memory, or back-battery random-access memory.

5. The computer-implemented method of claim 2, wherein the attempting the same change comprises attempting a write to a same channel of the persistent memory.

6. The computer-implemented method of claim 1, wherein the first processor continues performing non-writing operations while the first processor's attempt to change the state is prevented.

7. The computer-implemented method of claim 1, further comprising prompting the second processor to perform the same change as the first processor after determining that the first processor has attempted to change the state of the hardware security module.

* * * * *